United States Patent
Barron et al.

(10) Patent No.: US 9,454,425 B2
(45) Date of Patent: Sep. 27, 2016

(54) METHODS FOR ASSOCIATING STORAGE ERRORS WITH SPECIFIC THIRD PARTY ARRAYS AND DEVICES THEREOF

(71) Applicant: NetApp, Inc., Sunnyvale, CA (US)

(72) Inventors: Edward Barron, Pepperell, MA (US); Sonali Sahu, Waltham, MA (US)

(73) Assignee: NetApp, Inc., Sunnyvale, CA (US)

( * ) Notice: Subject to any disclaimer, the term of this patent is extended or adjusted under 35 U.S.C. 154(b) by 138 days.

(21) Appl. No.: 14/522,856

(22) Filed: Oct. 24, 2014

(65) Prior Publication Data
US 2016/0117209 A1   Apr. 28, 2016

(51) Int. Cl.
G06F 11/00 (2006.01)
G06F 11/07 (2006.01)

(52) U.S. Cl.
CPC ......... *G06F 11/079* (2013.01); *G06F 11/0727* (2013.01)

(58) Field of Classification Search
USPC ...................................... 714/6.22
See application file for complete search history.

(56) References Cited

U.S. PATENT DOCUMENTS

| | | | |
|---|---|---|---|
| 2012/0089860 A1* | 4/2012 | Zaifman | G06F 11/0709 714/2 |
| 2013/0305093 A1* | 11/2013 | Jayachandran | G06F 11/0754 714/37 |

* cited by examiner

*Primary Examiner* — Sarai Butler
(74) *Attorney, Agent, or Firm* — LeClairRyan, a Professional Corporation

(57) ABSTRACT

A method, non-transitory computer readable medium, and device that associates a storage error with a specific array includes receiving a request to display one or more storage errors associated with one or more physical storage mediums within a storage device. An error cache associated with each of the one or more physical storage mediums within the storage device is scanned to identify the one or more storage errors reported by at least one of the one or more physical storage mediums within the storage device. Based on one or more business rules, the identified one or more storage errors are checked whether they are in the required format. An error list comprising the identified one or more storage errors and their corresponding one or more physical storage mediums is provided when the identified one or more storage errors are determined to be in the required format.

18 Claims, 9 Drawing Sheets

Vgv3070f51ab::> storage device show

FIG. 4A

```
vgv3070f50::> storage devices show
    Name      Vendor    Model        Status
    ------    ------    -----        ------
    NETAPP-VT21  NETAPP   3240
    NETAPP-RACK1 NETAPP   DS14MK2/FCX Error
    SSG-1        NETAPP   ZORILLA
    EVA          HP       MSY360
    Amazon-Cloud AMAZON   CloudDisk Warning: Device errors detected. Use "storage device show -name XXX" for detailed information.

5 entries were displayed.

vgv3070f50::>
```

FIG. 4B

Vgv3070f51ab::> storage device show -name NETAPP-RACK-1

FIG. 5A

```
vgv3070f50::> storage device show -name NETAPP-RACK-1

Name: NETAPP-RACK-1
       Vendor: NETAPP
        Model: DS14MK2/FCX
     Capacity: 100TB (60% free)
% total cluster I/O: 100%
Serial Number: 500143700025d1510
Constituent Stacks: 8
     Policies: Evacuate on redundancy failure
   Error Text: Shelf 1.1 has 8 errors, use 'storage shelf show -errors' to display shelf errors
               Shelf 1.2 has 3 errors and 2 warnings Node          Initiator   Device Target Port     TPGN   Speed    (FR/s)   TOBE
------------  ---------   -------------------    ----   ------   ------   ----
vgv3070f50a     0a        200600a0b8190e18f       1     4 Gb/s     0        0
vgv3070f50a     0c        200600a0b8190e170       2     4 Gb/s     0        0
vgv3070f50b     0a        200700a0b8190e18f       1     4 Gb/s     3        1
vgv3070f50b     0c        200700a0b8190e170       2     4 Gb/s    46        1 vgv3070f50::>
```

Cooling View:

```
pgw9070sl:> storage shelf show -cooling
Shelf name:       1.1
Shelf id:         1
Shelf UID:        5c:05:cc:cc:c2:10:f2:89
Shelf s/n:
Shelf state:      normal
Model:            DS4486
Connection Type:  SAS
Disk Count:       48
Errors: Fan 4 on PSU 2 is running below normal RPM threshold. It should be replaced.

Fans:
# Fan Number Location RPM  STATUS
  --------- -------- ---- -------
  1         PSU1     1200 NORMAL
  2         PSU2     1200 NORMAL
  3         Module 1 1200 NORMAL
  4         Module 2  900 NORMAL Temperature Sensors:
                                            Low     High     High
# Location Temp Ambient   Low    High     warning critical status
                        critical warning
  -------- ---- ------- -------- ------- ------- ------- -------
1 PSU1     26   True       0      10      40      50     NORMAL
2 PSU2     26   True       0      10      50      60     NORMAL
3 Module 1 26   True       0      10      50      60     NORMAL pgw9070sl:>
```

FIG. 5D

Management View:

```
<<netapp01>> storage shelf show -shelf 1.1 -management
Shelf name:        1.1
Shelf id:          1
Shelf UID:         5a:b3:6c:7d:8e:02:10:13:89
Shelf S/N:
Term switch:       N/A
Shelf state:       normal
Model:             ns4183
Connection Type:   SAS
Disk count:        28
Errors: Fan #1 on ESM 2 is running below normal RPM threshold. It should be replaced.
```

Management Ports:

| # | Port type | MGMT Node | IP Address | Netmask | Domain | MAC Address | Status | Module ID | Firmware |
|---|-----------|-----------|------------|---------|--------|-------------|--------|-----------|----------|
| 1 | acp | 787387385a | 127.127.127.127 | 255.255.255.255 | netapp.com | aa:bb:cc:dd:ee:ff:ge:hk | Active | A | 1.1 |
| 2 | acp | 787387385a | 127.127.127.127 | 255.255.255.255 | netapp.com | aa:bb:cc:dd:ee:ff:ge:hk | Active | B | 1.1 |
| 3 | sas | 787387385a | 127.127.127.127 | 255.255.255.255 | netapp.com | aa:bb:cc:dd:ee:ff:ge:hk | Active | A | 1.1 |
| 4 | sas | 787387385a | 127.127.127.127 | 255.255.255.255 | netapp.com | aa:bb:cc:dd:ee:ff:ge:hk | Active | B | 1.1 |

```
<<netapp01>>
```

METHODS FOR ASSOCIATING STORAGE ERRORS WITH SPECIFIC THIRD PARTY ARRAYS AND DEVICES THEREOF

FIELD

This technology relates to identifying errors within a storage device and, more particularly, methods for associating a storage error with a specific array and devices thereof.

BACKGROUND

Various forms of network storage systems exist today including network attached storage (NAS), storage area networks (SANs), and others. These network storage systems are commonly used for a variety of purposes, such as providing multiple users with access to shared data, backing up critical data (e.g., by data mirroring), etc.

Typically, disk storage in these network storage systems is implemented as one or more storage volumes comprising physical storage disks, stacks of storage arrays, and storage tapes that are configured to define an overall logical arrangement of storage space. Due to the frequent use of these disk storages by users, monitoring the performance status of the disk storages has become extremely important. One of the most important aspects of this monitoring is to quickly identify errors within any of the storage devices. Unfortunately, to date prior technologies have not been able to effectively or efficiently perform this monitoring task.

SUMMARY

A method for associating a storage error with a specific array includes receiving, by a storage management computing device, a request to display one or more storage errors associated with one or more physical storage mediums within a storage device. An error cache associated with each of the one or more physical storage mediums within the storage device is scanned by the storage management computing device to identify the one or more storage errors reported by at least one of the one or more physical storage mediums within the storage device. Based on one or more business rules, the identified one or more storage errors are checked whether they are in the required format by the storage management computing device. An error list comprising the identified one or more storage errors and their corresponding one or more physical storage mediums is provided by the storage management computing device when the identified one or more storage errors are determined to be in the required format.

A non-transitory computer readable medium having stored thereon instructions for associating a storage error with a specific array comprising executable code which when executed by a processor, causes the processor to perform steps including receiving a request to display one or more storage errors associated with one or more physical storage mediums within a storage device. An error cache associated with each of the one or more physical storage mediums within the storage device is scanned to identify the one or more storage errors reported by at least one of the one or more physical storage mediums within the storage device. Based on one or more business rules, the identified one or more storage errors are checked whether they are in the required format. An error list comprising the identified one or more storage errors and their corresponding one or more physical storage mediums is provided when the identified one or more storage errors are determined to be in the required format.

A storage management computing device includes a processor and a memory coupled to the processor which is configured to be capable of executing programmed instructions comprising and stored in the memory to receive a request to display one or more storage errors associated with one or more physical storage mediums within a storage device. An error cache associated with each of the one or more physical storage mediums within the storage device is scanned to identify the one or more storage errors reported by at least one of the one or more physical storage mediums within the storage device. Based on one or more business rules, the identified one or more storage errors are checked whether they are in the required format. An error list comprising the identified one or more storage errors and their corresponding one or more physical storage mediums is provided when the identified one or more storage errors are determined to be in the required format.

This technology provides a number of advantages including providing methods, non-transitory computer readable medium and devices for associating a storage error with a specific array. By scanning only the error cache of the physical storage mediums within the storage device and not checking the actual functioning of the physical storage mediums within the storage device, the technology disclosed herein provides advantages of quickly and efficiently determining for storage errors. Additionally, by providing these different types of additional information, the technology disclosed herein provides advantages of providing a detailed description of the storage error associated with the physical storage mediums in the storage device.

BRIEF DESCRIPTION OF THE DRAWINGS

FIGS. 4A-4B are exemplary illustrations of a request to display errors and displaying the identified errors; and FIGS. 5A-5F are exemplary illustrations of request for additional information associated with the errors and the response.

DETAILED DESCRIPTION

Figure 1:
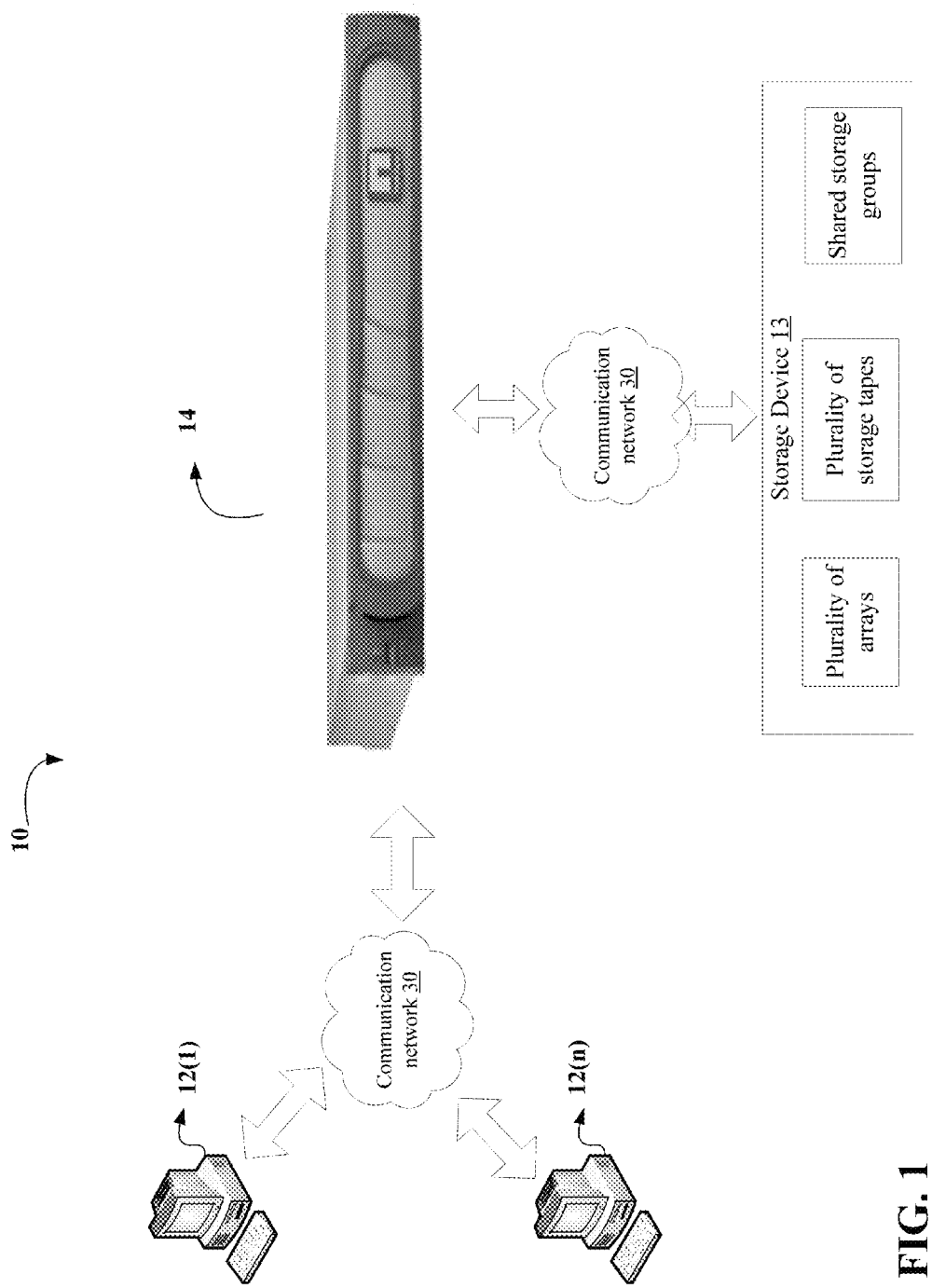
FIG. 1 is a block diagram of an environment with an exemplary storage management computing device.
Figure 2:
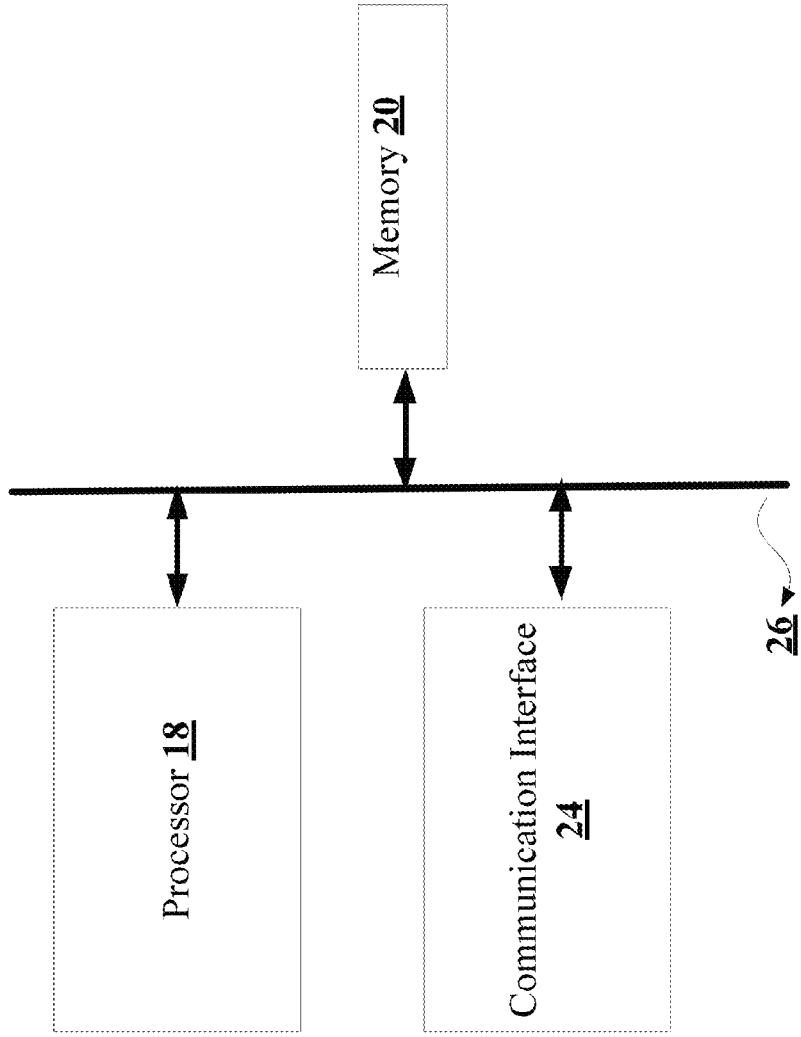
FIG. 2 is a block diagram of the exemplary storage management computing device shown in FIG. 1.
Figure 3:
FIG. 3 is a flow chart of an example of a method for associating a storage error with a specific array.

An environment 10 with a plurality of client computing devices 12(1)-12(n) and an exemplary storage management computing device 14 is illustrated in FIGS. 1-2. In this particular example, the environment 10 includes a plurality of client computing devices 12(1)-12(n), a storage device 13 and the storage management computing device 14 coupled via one or more communication networks 30, although the environment could include other types and numbers of systems, devices, components, and/or other elements. In this example, the method for associating a storage error with a specific array is executed by the storage management computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for associating storage errors with specific third party arrays.

Referring more specifically to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for replicating data and providing instantaneous access to data as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, an interface device, and an I/O system, which are coupled together by a bus or other link, although other numbers and types of network devices could be used. The plurality of client computing devices 12(1)-12(n) communicates with the storage management computing device 14 for requesting access to data, although the client computing devices 12(1)-12(n) can interact with the storage management computing device 14 for other purposes. By way of example, the plurality of client computing devices 12(1)-12 (n) may run interface application(s) that may provide an interface to make requests to access, modify, delete, edit, read or write data within storage management computing device 14 via the communication network 30.

As illustrated in FIG. 1, the storage device 13 is coupled to the storage management computing device 14 via communication network 30, although the storage device 13 can be coupled to the storage management computing device 14 via other topologies. In this example, the storage device 13 assists with storing of data required by the plurality of client computing devices 12(1)-12(n), although the storage device 13 can include other types or amounts of information. The storage device 13 includes physical storage mediums such as plurality of storage tapes, plurality of storage arrays and shared storage groups that can be easily identifiable within a storage system, although the storage device 13 can include other types of storage mediums. Additionally, each of the physical storage mediums within the storage device 13 includes an error cache where the physical storage mediums report their error, although the error cache can store or include other types or amounts of information.

Although the exemplary network environment 10 includes the plurality of client computing devices 12(1)-12 (n), the storage device 13 and the storage management computing device 14 described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An exemplary method for associating a storage error with a specific array will now be described herein with reference to FIGS. 1-5F. Particularly with reference to FIG. 3, in step 305, the storage management computing device 14 receives a request from one of the plurality of client computing devices 12(1)-12(n) to check when there is a storage error reported by the physical storage medium within the storage device 13 via a command interface displayed on the requesting one of the plurality of client computing devices 12(1)-12(n), although the storage management computing device 14 can receive other types of requests. By way of example only, the requested received by the storage management computing device 14 can be in the form of "storage array show" as illustrated in FIG. 4A.

In step 310, responsive to the request, the storage management computing device 14 determines when there is at least one storage error reported by the physical storage mediums within the storage device 13. By way of example only, the storage management computing device 14 scans the error cache within each of the physical storage mediums in the storage device 13 to determine if there are any storage errors, although the storage management computing device 14 can use other types and/or numbers of techniques. For purpose of further illustration, the error cache in this technology includes any storage errors reported by the physical storage mediums within the storage device 13. As previously illustrated, there is one error cache for each of the storage medium in the storage device 13, although multiple error caches can be assigned to each of the physical storage mediums within the storage device 13. Further, the error cache includes information associated with storage error(s) reported by the physical storage medium such as time of error, type of error, name of the physical storage medium within the storage device 13, type of the physical storage medium within the storage device 13, although error cache can include other types of information associated with the physical storage medium within the storage device 13. By scanning only the error cache of the physical storage mediums within the storage device 13 and not checking the actual functioning of the physical storage mediums within the storage device 13, the technology disclosed herein provides advantages of quickly and efficiently determining for storage errors. Accordingly, if the storage management computing device 14 determines there is no storage error reported by any of the physical storage mediums within the storage device 13, then the No branch is taken back to step 350 where the storage management computing device 14 displays no storage errors found within the physical storage medium in the storage device 13 and this example of the method ends. However, if the storage management computing device 14 determines there is at least one storage error reported by at least one storage medium within the storage device 13, then the Yes branch is taken to step 315.

In step 315, the storage management computing device 14 determines whether each of the storage error reported by the physical storage medium within the storage device 13 is in a required format. By way of example only, the memory 20 within storage management computing device 14 includes one or more business rules which define the format in which the storage error has to be reported by a physical storage medium within the storage device 13. The storage management computing device 14 checks whether the storage error reported by the physical storage medium within the storage device 13 included in the error cache satisfies the one or more business rules to determine whether the storage error is reported in the required format, although the storage management computing device 14 can use other techniques.

Accordingly, if the storage management computing device 14 determines the storage error is reported in the required format, then the Yes branch is taken back to step 325 which will be further illustrated and described below. However, if the storage management computing device 14 determines that the storage error is not in the required format, then the No branch is taken to step 320. Alternatively, in another example, this step of determining if the storage error is reported in the required format may be optional as each of the physical storage mediums in the storage device 13 can be configured to be capable of always reporting the storage errors in the format required by the storage management computing device 14.

In step 320, the storage management computing device 14 can request the physical storage mediums within the storage device 13 to report the one or more storage errors in the required format. Alternatively, this step of requesting the physical storage mediums within the storage device 13 to report the one or more storage errors in the required format can be optional as the as each of the physical storage medium in the storage device 13 can be configured to be capable of always reporting the storage errors in the format required by the storage management computing device 14.

Next in step 325, the storage management computing device 14 displays the identified one or more storage errors in the command interface of the requesting one of the plurality of client computing devices 12(1)-12(n), although the storage management computing device 14 can provide the identified storage one or more storage errors to the requesting one of the plurality of client computing devices 12(1)-12(n) using other techniques. An example of the identified one or more storage errors displayed on the requesting one of the plurality of client computing devices 12(1)-12(n) is illustrated in FIG. 4B.

In step 330, the storage management computing device 14 determines whether the requesting one of the plurality of client computing devices 12(1)-12(n) requires additional information associated with the reported storage errors. By way of example only, the storage management computing device can provide a notification as illustrated in FIG. 4B indicating that the requesting one of the plurality of client computing devices 12(1)-12(n) is required to submit a new request for additional information associated with the one or more storage errors. Alternatively, in another example, the storage management computing device 14 can automatically receive the request for additional information from the requesting one of the plurality of client computing devices 12(1)-12(n) without even displaying the notification.

Accordingly, if the storage management computing device 14 determines the requesting one of the plurality of client computing devices 12(1)-12(n) does not require additional information, then the No branch is taken to step 350 where this example of the method ends. However, if the storage management computing device 14 determines the requesting one of the plurality of client computing devices 12(1)-12(n) requires additional information, then the Yes branch is taken to step 335.

In step 335, the storage management computing device 14 receives a new request for additional information associated with the one or more storage errors associated with one of the physical storage mediums within the storage device 13 from the requesting one of the plurality of client computing devices 12(1)-12(n) as illustrated in FIG. 5A. For purpose of further illustration, the storage management computing device 14 receives a request for additional information from the requesting one of the plurality of client computing devices 12(1)-12(n) for the storage error associated the physical storage medium with name "NETAPP-RACK-1" as illustrated in FIG. 5A. Alternatively in another example, the storage management computing device 14 can receive a new request for additional information associated with storage errors reported by multiple physical storage mediums within the storage device 13. In another example, the storage management computing device 14 can receive the new request to display the connectivity view, cooling view, management view or statistical view associated with the physical storage medium within the storage device 13.

In step 340, the storage management computing device 14 obtains the requested additional information for the physical storage medium within the storage device 13 from the associated error cache, although the storage management computing device 14 can obtain the requested additional information from other locations.

Figure 5C:
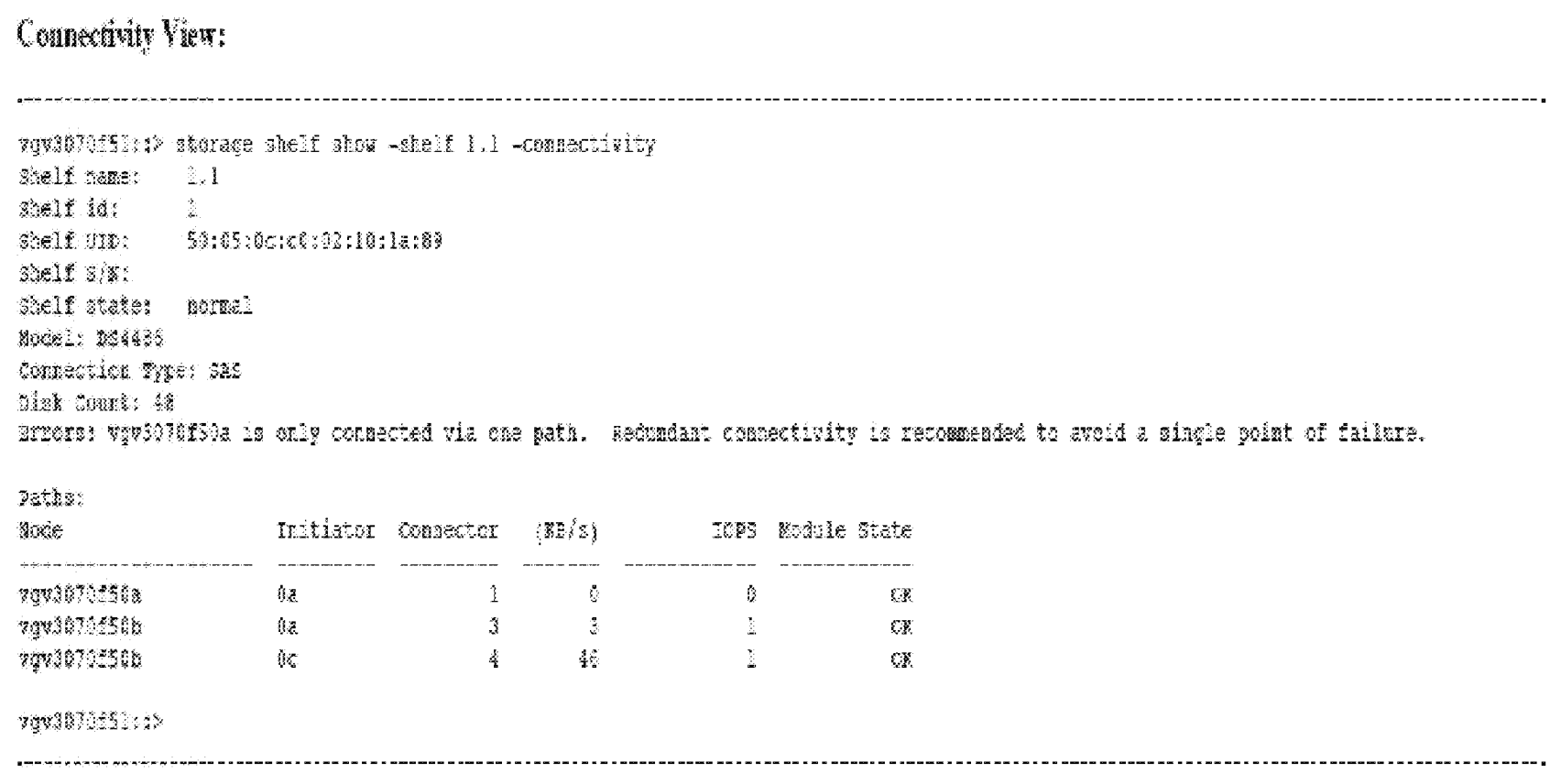

In step 345, the storage management computing device 14 provides the obtained additional information to the requesting one of the plurality of client computing devices 12(1)-12(n) and the exemplary method then ends in step 350. As previously illustrated, the storage management computing device 14 can provide the obtained additional information on the command interface on the requesting one of the plurality of client computing devices 12(1)-12(n) as illustrated in FIGS. 5B-5F, although the storage management computing device 14 can provide the obtained information using other techniques. By way of example only, FIG. 5B illustrates additional information associated with the physical storage medium with name "NETAPP-RACK-1".

Figure 5F:
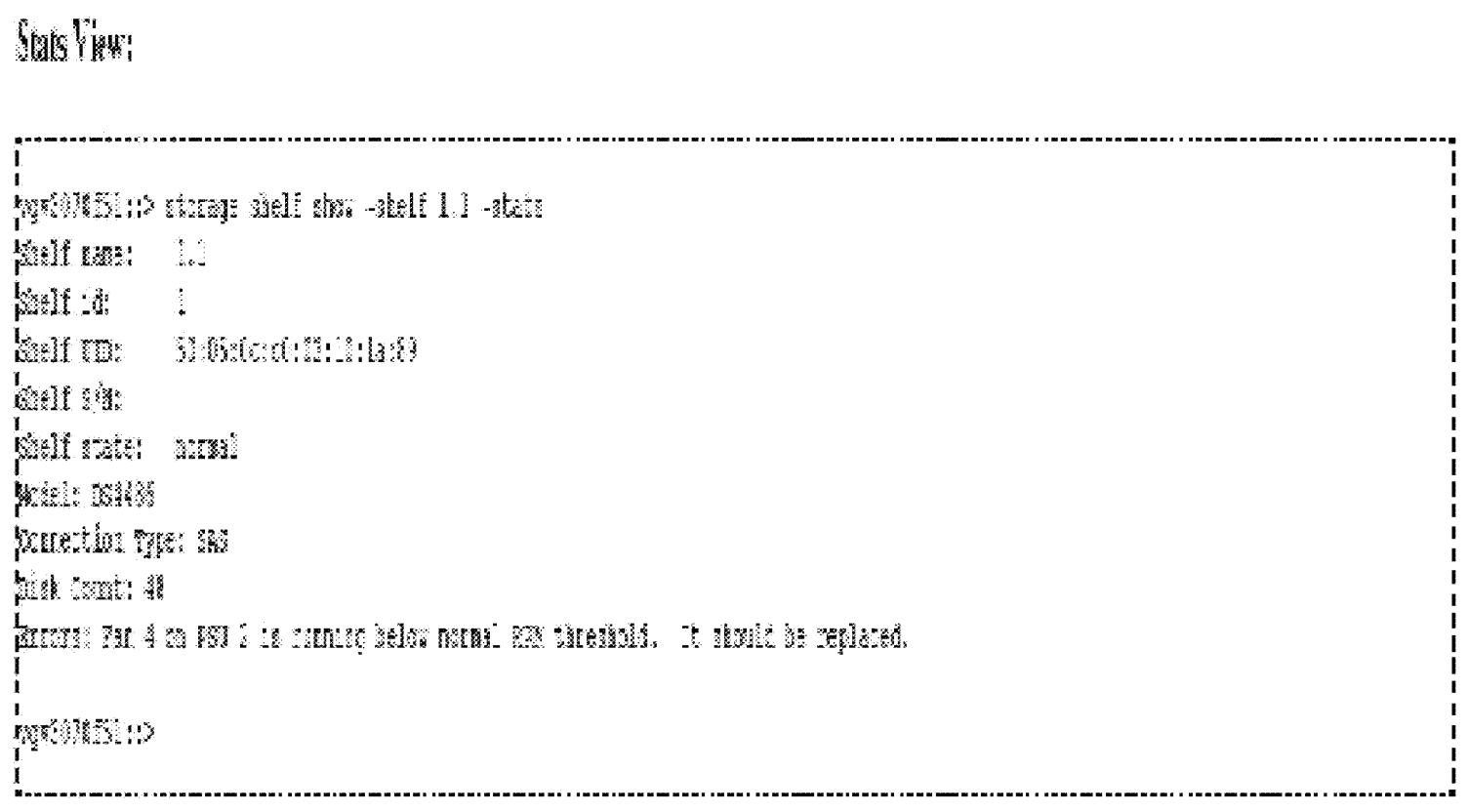

Further, the storage management computing device 14 can provide additional information associated with the storage errors in different formats. By way of example only and as previously illustrated, if the received request for additional information is relating to a connectivity view of the storage shelf (which is also a type physical storage medium within the storage device 13), then storage management computing device 14 provides additional information that is requested by the requesting one of the plurality of client computing devices 12(1)-12(n) as illustrated in FIG. 5C. Furthermore, the storage management computing device 14 can also provide the requesting one of the plurality of client computing devices 12(1)-12(n) with a cooling view illustrated in FIG. 5D of the storage shelf as additional information. Additionally, the storage management computing device 14 can provide a management view as illustrated in FIG. 5E to the requesting one of the plurality of client computing devices 12(1)-12(n) as additional information when there is a corresponding request from the requesting one of the plurality of client computing devices 12(1)-12(n). Alternatively, the storage management computing device 14 can provide a statistical view as illustrated in FIG. 5F to the requesting one of the plurality of client computing devices 12(1)-12(n) when there is a corresponding request from the requesting one of the plurality of client computing devices 12(1)-12(n). By providing these different types of additional information, the technology disclosed herein provides advantages of providing a detailed description of the storage error associated with the physical storage mediums in the storage device 13.

Accordingly, as illustrated and described with reference to the examples herein, this technology provides methods, non-transitory computer readable medium and devices that are able to effectively and efficiently associate a storage error with a specific array. By scanning only the error cache of the physical storage mediums within the storage device and not checking the actual functioning of the physical storage mediums within the storage device, the technology disclosed herein provides advantages of quickly and efficiently determining for storage errors. Additionally, by providing these different types of additional information, the technology disclosed herein provides advantages of providing a detailed description of the storage error associated with the physical storage mediums in the storage device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for associating a storage error with a specific array, the method comprising:
   receiving, by a storage management computing device, a request to display one or more storage errors associated with one or more physical storage mediums within a storage device;
   scanning, by the storage management computing device, an error cache associated with each of the one or more physical storage mediums within the storage device to identify the one or more storage errors reported by at least one of the one or more physical storage mediums within the storage device;
   determining, by the storage management computing device, when the identified one or more storage errors are in a required format based on one or more business rules; and
   providing, by the storage management computing device, an error list comprising the identified one or more storage errors and their corresponding one or more physical storage mediums when the identified one or more storage errors are determined to be in the required format.

2. The method as set forth in claim 1 further comprising determining, by the storage management computing device, when additional information associated with the identified one or more storage errors is required.

3. The method as set forth in claim 2 further comprising obtaining, by the storage management computing device, additional information associated with the identified one or more storage errors from the error cache of the one or more physical storage mediums having reported the identified one or more storage errors.

4. The method as set forth in claim 3 further comprising, providing, by the storage management computing device, the obtained additional information associated with the identified one or more storage errors.

5. The method as set forth in claim 4 wherein the providing further comprises, providing, by the storage management computing device, the obtained additional information in one or more different formats.

6. The method as set forth in claim 1 further comprising, providing, by the storage management computing device, a notification indicating no errors reported by the one or more physical storage mediums within the storage device when the one or more errors within the error cache associated with each of the one or more physical storage mediums is absent.

7. A non-transitory computer readable medium having stored thereon instructions for associating a storage error with a specific array comprising executable code which when executed by a processor, causes the processor to perform steps comprising:
   receiving a request to display one or more storage errors associated with one or more physical storage mediums within a storage device;

scanning an error cache associated with each of the one or more physical storage mediums within the storage device to identify the one or more storage errors reported by at least one of the one or more physical storage mediums within the storage device;

determining when the identified one or more storage errors are in a required format based on one or more business rules; and providing an error list comprising the identified one or more storage errors and their corresponding one or more physical storage mediums when the identified one or more storage errors are determined to be in the required format.

8. The medium as set forth in claim 7 further comprising determining when additional information associated with the identified one or more storage errors is required.

9. The medium as set forth in claim 8 further comprising obtaining additional information associated with the identified one or more storage errors from the error cache of the one or more physical storage mediums having reported the identified one or more storage errors.

10. The medium as set forth in claim 9 further comprising providing the obtained additional information associated with the identified one or more storage errors.

11. The medium as set forth in claim 10 providing the obtained additional information in one or more different formats.

12. The medium as set forth in claim 7 further comprising providing a notification indicating no errors reported by the one or more physical storage mediums within the storage device when the one or more errors within the error cache associated with each of the one or more physical storage mediums is absent.

13. A storage management computing device comprising:
a processor;
a memory coupled to the processor which is configured to be capable of executing programmed instructions comprising and stored in the memory to:
receive a request to display one or more storage errors associated with one or more physical storage mediums within a storage device;
scan an error cache associated with each of the one or more physical storage mediums within the storage device to identify the one or more storage errors reported by at least one of the one or more physical storage mediums within the storage device;
determine when the identified one or more storage errors are in a required format based on one or more business rules; and
provide an error list comprising the identified one or more storage errors and their corresponding one or more physical storage mediums when the identified one or more storage errors are determined to be in the required format.

14. The device as set forth in claim 13, wherein the processor coupled to the memory is further configured to be capable of executing at least one additional programmed instruction comprising and stored in the memory to determine when additional information associated with the identified one or more storage errors is required.

15. The device as set forth in claim 14, wherein the processor coupled to the memory is further configured to be capable of executing at least one additional programmed instruction comprising and stored in the memory to obtain additional information associated with the identified one or more storage errors from the error cache of the one or more physical storage mediums having reported the identified one or more storage errors.

16. The device as set forth in claim 15, wherein the processor coupled to the memory is further configured to be capable of executing at least one additional programmed instruction comprising and stored in the memory to provide the obtained additional information associated with the identified one or more storage errors.

17. The device as set forth in claim 16, wherein the processor coupled to the memory is further configured to be capable of executing at least one additional programmed instruction comprising and stored in the memory to provide the obtained additional information in one or more different formats.

18. The device as set forth in claim 13, wherein the processor coupled to the memory is further configured to be capable of executing at least one additional programmed instruction comprising and stored in the memory to provide a notification indicating no errors reported by the one or more physical storage mediums within the storage device when the one or more errors within the error cache associated with each of the one or more physical storage mediums is absent.

* * * * *